United States Patent
Wang et al.

(10) Patent No.: US 10,681,302 B2
(45) Date of Patent: Jun. 9, 2020

(54) DISPLAY DEVICE AUTO BRIGHTNESS ADJUSTMENT CONTROLLED BY A SOURCE DEVICE

(71) Applicant: ARRIS Enterprises LLC, Suwanee, GA (US)

(72) Inventors: Qi Wang, Shanghai (CN); Luyan Sun, Shanghai (CN); Qili Gu, Jiang Su (CN); Wanting Yang, Shanghai (CN); Hongbin Zhou, Shanghai (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 15/551,523

(22) PCT Filed: Dec. 20, 2016

(86) PCT No.: PCT/CN2016/110984
§ 371 (c)(1),
(2) Date: Aug. 16, 2017

(87) PCT Pub. No.: WO2018/112730
PCT Pub. Date: Jun. 28, 2018

(65) Prior Publication Data
US 2019/0313050 A1   Oct. 10, 2019

(51) Int. Cl.
*H04N 5/58* (2006.01)
*H04N 21/422* (2011.01)
(Continued)

(52) U.S. Cl.
CPC .............. *H04N 5/58* (2013.01); *G09G 5/10* (2013.01); *H04N 21/41* (2013.01);
(Continued)

(58) Field of Classification Search
CPC .............. H04N 5/58; H04N 21/42202; G09G 2360/144
See application file for complete search history.

(56) References Cited

U.S. PATENT DOCUMENTS

| 3,813,686 A | 5/1974 | Mierzwinski |
| 6,411,306 B1 | 6/2002 | Miller et al. |

(Continued)

FOREIGN PATENT DOCUMENTS

| CN | 101355665 A | 1/2009 |
| CN | 101369418 A | 2/2009 |

(Continued)

OTHER PUBLICATIONS

PCT International Search Report & Written Opinion, Re: Application No. PCT/CN2016/110984, dated Sep. 21, 2017.

*Primary Examiner* — Brian P Yenke
(74) *Attorney, Agent, or Firm* — Wenderoth, Lind & Ponack, L.L.P.

(57) ABSTRACT

Methods, systems, and computer readable media operable for adjusting brightness of a display screen. A first interface is configured to provide information, including display brightness information, to the display device through a high-definition multimedia interface (HDMI). Brightness circuitry is configured to process brightness information from one or more sensors detecting ambient light level. A module is configured to generate control information to control the brightness of the display device and to provide the control information to the display device.

20 Claims, 7 Drawing Sheets

(51) Int. Cl.
*G09G 5/10* (2006.01)
*H04N 21/485* (2011.01)
*H04N 21/41* (2011.01)

(52) U.S. Cl.
CPC ... *H04N 21/42202* (2013.01); *H04N 21/4854* (2013.01); *G09G 2360/144* (2013.01)

(56) References Cited

U.S. PATENT DOCUMENTS

| | | | |
|---|---|---|---|
| 8,982,163 B2* | 3/2015 | Lu | H04N 5/58 |
| | | | 345/690 |
| 9,144,144 B2* | 9/2015 | Clavenna, II | H05B 47/105 |
| 9,239,837 B2* | 1/2016 | Chardon | G06F 3/04886 |
| 9,386,669 B2* | 7/2016 | Karc | H05B 37/0272 |
| 9,483,982 B1* | 11/2016 | Reddy | G09G 3/3406 |
| 9,648,294 B2* | 5/2017 | Masuyama | H04N 9/64 |
| 9,693,003 B1* | 6/2017 | Vassigh | H04N 5/44 |
| 9,773,409 B1* | 9/2017 | Sanders | G08C 17/02 |
| 9,792,878 B2* | 10/2017 | Yoon | G09G 3/14 |
| 9,799,306 B2* | 10/2017 | Dunn | G09G 5/02 |
| 9,813,661 B2* | 11/2017 | Freudenthal | H04N 21/4126 |
| 9,832,511 B2* | 11/2017 | Ogle | H04W 4/21 |
| 9,842,530 B2* | 12/2017 | Carlsson | G09G 3/2007 |
| 9,875,694 B2* | 1/2018 | Shintani | G09G 3/3406 |
| 9,927,867 B2* | 3/2018 | Yeom | G09G 5/00 |
| 9,961,408 B2* | 5/2018 | Mickelsen | H04N 21/42221 |
| 9,990,749 B2* | 6/2018 | Kunkel | H04N 9/67 |
| 10,102,878 B2* | 10/2018 | Kolesnikov | G11B 27/005 |
| 10,143,068 B2* | 11/2018 | Karc | H05B 37/0272 |
| 10,255,884 B2* | 4/2019 | Dunn | G09G 5/02 |
| 10,349,131 B2* | 7/2019 | Vassigh | H04N 21/485 |
| 2004/0012556 A1* | 1/2004 | Yong | G06F 3/0202 |
| | | | 345/102 |
| 2005/0117062 A1 | 6/2005 | Chien et al. | |
| 2010/0302447 A1* | 12/2010 | Shirai | H04N 9/73 |
| | | | 348/607 |
| 2012/0057078 A1* | 3/2012 | Fincham | H04N 5/57 |
| | | | 348/645 |
| 2012/0182276 A1* | 7/2012 | Kee | G09G 5/10 |
| | | | 345/207 |
| 2012/0274863 A1* | 11/2012 | Chardon | G06F 3/04886 |
| | | | 348/734 |
| 2013/0088644 A1* | 4/2013 | Atkins | H04N 1/603 |
| | | | 348/602 |
| 2015/0089551 A1* | 3/2015 | Bruhn | H04N 7/106 |
| | | | 725/80 |
| 2015/0091473 A1* | 4/2015 | Clavenna, II | H05B 47/19 |
| | | | 315/297 |
| 2015/0156554 A1* | 6/2015 | Sirpal | H04N 21/4858 |
| | | | 725/37 |
| 2015/0189724 A1* | 7/2015 | Karc | H05B 37/0272 |
| | | | 315/149 |
| 2016/0133227 A1* | 5/2016 | Yoon | G09G 3/14 |
| | | | 345/593 |
| 2016/0180809 A1* | 6/2016 | Mickelsen | H04N 21/42221 |
| | | | 345/207 |
| 2016/0261820 A1* | 9/2016 | Freudenthal | H04N 21/4126 |
| 2017/0034520 A1* | 2/2017 | Rosewarne | H04N 19/1887 |
| 2017/0062005 A1* | 3/2017 | Kolesnikov | G11B 27/005 |
| 2017/0213494 A1* | 7/2017 | Carlsson | G09G 3/2007 |
| 2017/0264851 A1* | 9/2017 | Kuplevakhsky | G09G 3/20 |
| 2017/0285594 A1* | 10/2017 | Stewart | H05B 47/105 |
| 2017/0289618 A1* | 10/2017 | Vassigh | H04N 5/44 |
| 2017/0353704 A1* | 12/2017 | Su | H04N 9/646 |
| 2018/0218710 A1* | 8/2018 | Park | G09G 5/10 |
| 2018/0227640 A1* | 8/2018 | Mickelsen | H04N 21/42221 |
| 2018/0338104 A1* | 11/2018 | Pines | G09G 5/00 |
| 2019/0237045 A1* | 8/2019 | Dunn | G09G 5/10 |

FOREIGN PATENT DOCUMENTS

| | | |
|---|---|---|
| CN | 102088630 A | 6/2011 |
| CN | 201976222 U | 9/2011 |
| CN | 105187869 A | 12/2015 |
| CN | 105979311 A | 9/2016 |

* cited by examiner

DISPLAY DEVICE AUTO BRIGHTNESS ADJUSTMENT CONTROLLED BY A SOURCE DEVICE

1. FIELD OF THE INVENTION

The present invention relates to automatic brightness adjustment of a display device; and, more particularly, to an apparatus, method and computer readable memory providing a source device and instructions for controlling brightness adjustment function of a display device.

2. DESCRIPTION OF THE PRIOR ART

Automatic adjustment of TV displays has presented problems. In darkly lit rooms or very brightly lit rooms, the TV images tend to be either too harsh or washed out with minimal contrast, making it difficult to read text and other critical details. Generally, brightness and contrast settings combined determine how much light a TV display emits. Unlike a light bulb, a TV is an information display device; more light from the screen is not necessarily better for the user. Too low a brightness leads to poor illumination in portions of the TV image, while too high a brightness leads to bleaching of fine details within the TV image. Overly bright displays may incorrectly represent the original broadcast or movie content, or may harm picture quality by washing out dark areas of the screen making text more difficult to read.

A number of TV manufacturers are considering implementing automatic brightness control to enhance picture quality and save energy as commonly offered as a feature of display devices, such as smartphones and tablets. In attempts to address TV display adjustment problems, various heretofore disclosed and utilized systems and methods have been contemplated that incorporate a room brightness detector that is wired into the electronic circuit of the TV to adjust the brightness. This feature is sometimes available in expensive TVs, but it is not offered in standard TV sets or the vast majority of TV sets currently used by consumers.

U.S. Pat. No. 3,813,686 to Mierzwinski discloses ambient light response control of brightness, contrast and color saturation. A circuit is deployed in a color television receiver for varying the brightness, contrast and color saturation of a displayed picture according to variations in ambient light in the vicinity of a receiver screen. The circuit is comprised of a light sensor mounted near the receiver screen. The electrical parameter of a cadmium sulphide cell of a resistance sensor is varied in accordance with intensity of the light incident on the light sensor. These variations in resistance are used to control the gain of both the chrominance and the luminance amplifiers of the receiver. The luminance gain is changed with a first particular gain rate and the chrominance gain is changed at a second particular gain rate with a given change in ambient light level. Accordingly, both chrominance and the luminance are adjusted. This control is present within a particular color TV; but is not available in a set-top box connectable to any TV that has HDMI connectivity.

U.S. Pat. No. 6,411,306 to Miller et al. discloses automatic luminance and contrast adjustment for a display device This apparatus and method dynamically modifies both the luminance and contrast of an image as it is displayed on a display unit in response to changing lighting conditions. Sensors are utilized to continually measure the luminance of the light illuminating the display unit and the display surround luminance. Measurement signals generated by the light sensors are processed to provide display luminance and contrast adjustment control signals that gradually cause the adjustment of the display unit's luminance and contrast in response thereto. The brightness and contrast perception of the displayed image remains constant under the varying lighting conditions. The display power consumption is decreased in dim environments. This control is present within a particular display device and is not available in a set-top box connectable to any TV that has HDMI connectivity.

Based on the foregoing, there exists a need in the art for a procedure available for adjusting the TV display brightness according to the ambient illumination brightness. Further needed is a set-top box connectable to any TV that has HDMI connectivity.

SUMMARY OF THE INVENTION

The present invention provides methods, systems, and computer readable media operable to facilitate adjustment of brightness of a display device through an interface or source device, both manually and automatically. Preferably, the display device includes a high-definition multimedia interface and consumer electronics control (HDMI-CEC) functionality, such as a television. Alternatively, the display device may be a mobile device. The interface or source device preferably includes an access point, or a set-top box.

In one aspect of the invention, an apparatus is provided operable to adjust viewing brightness of a display screen. A first interface is configured to provide information, including display brightness information, to the display device through a high-definition multimedia interface (HDMI). Brightness circuitry is configured to process brightness information from one or more sensors detecting ambient light level. A module is configured to generate control information to control the brightness of the display device and to provide the control information to the display device.

Another aspect of the invention is directed to a method for providing instructions to adjust brightness of a display device connected to a source device, comprising the steps of: 1. detecting an ambient light level proximate to the display device; 2. determining a preferred viewing brightness of the display device based on the ambient light level; 3. determining control information to instruct the display device to provide the preferred viewing brightness; and 4. providing the control information to the display device. The control information is provided from the source device to the display device through a high-definition multimedia interface (HDMI).

Yet another aspect of the invention provides one or more non-transitory computer readable media having instructions operable to cause one or more processors to adjust brightness of a display device connected to a source device performing the operations comprising: detecting an ambient light level proximate to the display device; determining a preferred viewing brightness of the display device based on the ambient light level; determining control information to instruct the display device to provide the preferred viewing brightness; and providing the control information to the display device; wherein the control information is provided from the source device to the display device through a high-definition multimedia interface (HDMI).

BRIEF DESCRIPTION OF THE DRAWING

The invention will be more fully understood and further advantages will become apparent when reference is had to the following detailed description of the preferred embodiments of the invention and the accompanying drawing, in which.

DETAILED DESCRIPTION OF THE INVENTION

A first interface is configured to be used to receive content including television display brightness information through a high-definition multimedia interface (HDMI) communicating with a consumer electronics control (CEC) enabled television to a set-top box. The set-top box has circuitry to process brightness information from one or more sensors detecting ambient light level and communicating the brightness information to the television through the HDMI. A module is configured to measure the display brightness information based on ambient light level detected by the sensor and execute CEC codes to adjust the display brightness of the television display relative to the measured ambient light level.

In another aspect of the invention, a set-top box is equipped with Internet connectivity and can communicate with an external device that includes servers for brightness/luminance data collection, customer television channel viewing preferences, viewing times and the like. Since the set-top box is connected to the Internet, it can download or stream video and audio data for viewing on the television display. Accordingly, the display brightness of the television is adjusted according to the measured brightness level of the environment. When connected to a server, multiple set-top boxes can adjust display brightness and luminance of a plurality of televisions.

Use of the disclosed methods, systems, and computer readable media described herein provides the novel ability to adjust brightness of a display screen through an interface or a source device. The subject methods, systems, and computer readable media are operable with existing HDMI-CEC platforms without the need to add any additional hardware cost to th display device, such as a TV for non-limiting example, and only minimal hardware addition to the source device, such as an access point or set-top box (STB), only including addition of an ambient light sensor (and upgrading of program software to include the function).

Embodiments of the present invention relate to an apparatus, method and computer readable memory wherein a source device—set-top box—provides a dimming function as well as Internet functions to a display device, particularly a TV. The set-top box has one or more sensors that measure the ambient light at one or more locations to calculate the desired TV brightness setting using an algorithm for better viewing of TV images. One of the sensors may directly view the TV screen display, aiding in the adjustment of TV display intensity.

Automatic brightness control has been implement in portable mobile devices, such as smartphones and tablets, for quite some time, therefore light sensory technology in automatic screen display brightness adjustment has been facilitated. However, automatic screen display brightness adjustment by way of a set-top box represents novel technology and provides several advantages.

Advantageously, the subject method, system and computer readable media provides a relatively inexpensive means to provide automatic adjustment control to a TV display. While newer high-end TVs include technology for automatic adjustment control, more affordable TVs lack the technology. What is more, the vast majority of existing TVs presently in use lack auto brightness adjustment technology. Uniquely, the present invention provides the ability to integrate auto brightness adjustment technology in HDMI-CEC functional TVs through a set-top box. Value is added to the set-top box increasing the operator's sales point through the hardware and software integration of the ambient light sensor, with minimum increase in cost, especially when compared to costs associated with updating current TV sets or replacing a TV set with a more expensive model. Additionally, the subject system, method and computer readable memory provides the enhanced ability to integrate all configurations about user's perspective to set-top box functionality, including auto brightness control, as well as volume control and standby control. Simplification of the TV set can be advanced to remove complicated features to a replaceable box, leaving the TV "set" as a pure display device. Additionally, more flexible features can be realized, such as differentiated volume choice or subtitle auto hide/display in day/night scheme. Luminance data can also be gathered and centrally analyzed online.

Unlike a light bulb, a TV is an information display device; more light from the screen is not necessarily better for the user. Overly bright displays may incorrectly represent the original broadcast or movie content that the user was intended to see, or may harm picture quality by washing out dark areas of the screen or making text more difficult to read. Many manufacturers are considering use of an automatic brightness control to enhance picture quality and save energy. However, this is commonly considered as a feature of display devices. The contrast level also requires adjustment as the brightness level of the TV is changed. Having a wrong brightness level or contrast prevents readability of text on the TV screen.

Specifically, one or more environment light sensors are added to a front panel of the subject apparatus or source device. The environment light sensors measure the light intensity of the room. The sensors may be placed on an extended wire so that they are well exposed to ambient light if an embedded set-top box is hidden behind the TV set. The sensors may be wireless sensors configured to communicate with wireless inputs of the source device, particularly STB or access point devices and Internet of Things protocols, such as WiFi, Bluetooth or ZigBee, 6LowPAN, via network protocol defining encapsulation and header compression mechanisms. Based on this light intensity amount, the HDMI service of the set-top box adjusts the brightness of the TV display through CEC protocol. Consumer Electronics Control (CEC) is a feature of HDMI designed to allow users to command a component to control the menu system of another component by passing through the user interface (UI) commands.

Preferably, the light sensor is integrated within the front panel of the set-top box. Light intensity of the room is measured by the light sensor. An extension wire can be integrated with the light sensor so that it can be lengthened for placement at a location that optimized light exposure of the light sensor. This has particular applications wherein the set-top box is located in a closet or hidden behind a TV set or other equipment. Based on the light intensity detected by the (e.g. ambient) light sensor, the HDMI service of the set-top box adjusts the brightness of the TV display through HDMI-CEC protocol (e.g. HDMI protocol (2.0)). Software can readily be implemented with current HDMI protocol to support HDMI-CEC display brightness adjustment communicated from the photodetector or photosensor or ambient light sensor of the set-top box. It is technically realizable to integrate an optical sensor to a set-top box's front panel with limited cost increase associated with the set-top box. Because HDMI service is already implemented in set-top box platform software, which is capable to communicate with a TV set to control its volume and standby status via CEC protocol. Uniquely, the subject system and method provides extended service to support additional control via brightness adjustment, through the HDMI-CEC interface.

The integration of optical sensors to the set-to box front panel only adds limited cost up, as compared to adding these features to a standard TV set. The HDMI functionality is already implemented in set-top box platform software and is capable of communicating with the TV set to control its volume and standby status via CEC protocol. It's natural and reasonable to extend the service to support additional control such as brightness adjustment and contrast adjustment based on the ambient lighting conditions.

All TV display devices have a preset maximum and minimum brightness level. The algorithm present in the set-top box has these brightness value limits of the TV display incorporated within the calculation.

The apparatus, method and computer readable memory may comprise one or more high-definition multimedia interface (HDMI) adapted to communicate with consumer electronics control (CEC) enabled features in a standard television. Each of one or more standard television sets is connected to a set-top box that is separate and distinct from the corresponding television. The set-top box has circuitry including a microcontroller to process brightness information provided by one or more sensors viewing ambient environment brightness and television display screen brightness. The set-top box communicates the sensor derived brightness information to the standard television through a HDMI cable and provides CEC codes to adjust the brightness level and luminance level of the television display.

In one embodiment, the set top box dynamically controls the brightness of TV display as a function of ambient environment brightness. The adjustment of TV display brightness is linked to the contrast setting of the TV display for optimal TV picture display.

Some of the available HDMI-CEC commands are listed below:

One Touch Play: the device will become active source when playback starts;

System Standby: switches all connected devices to standby;

Preset Transfer: transfers the tuner channel setup to another TV set;

One Touch Record: start recording immediately;

Timer Programming: allow one device (e.g. a TV set or HTPC) to set the timer programming of another (e.g. a PVR/DVR or DVD-recorder);

System Information: checks all components for business addresses and configuration;

Deck Control: playback control;

Tuner Control: control the tuner of another device;

OSD Display: use the OSD of the TV set to display text;

Device Menu Control: use the menus of another device;

Routing Control: control the switching of signal sources;

Remote Control Pass Through: pass through remote control commands; and

Device OSD Name Transfer: transfer the preferred device names to the TV set.

Figure 3:
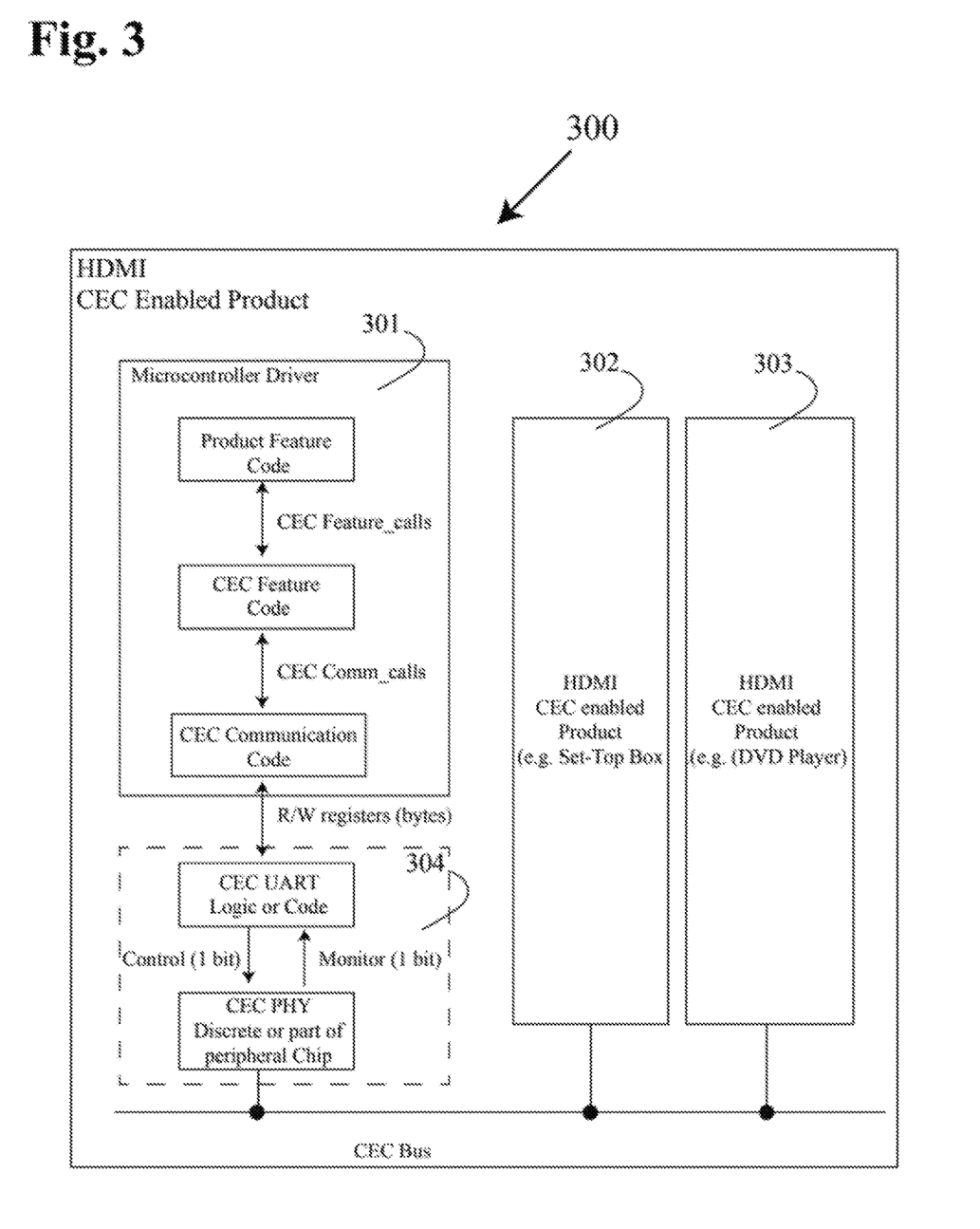
FIG. 3 illustrates more details of the HDMI device which is CEC enabled.

The solution offered herein does not require the electronics modification in HDMI connection part (like HDMI controller, HDMI bus), the CEC driver is already integrated in transmitter/receiver on both sides as shown in FIG. 3 below.

Figure 1:
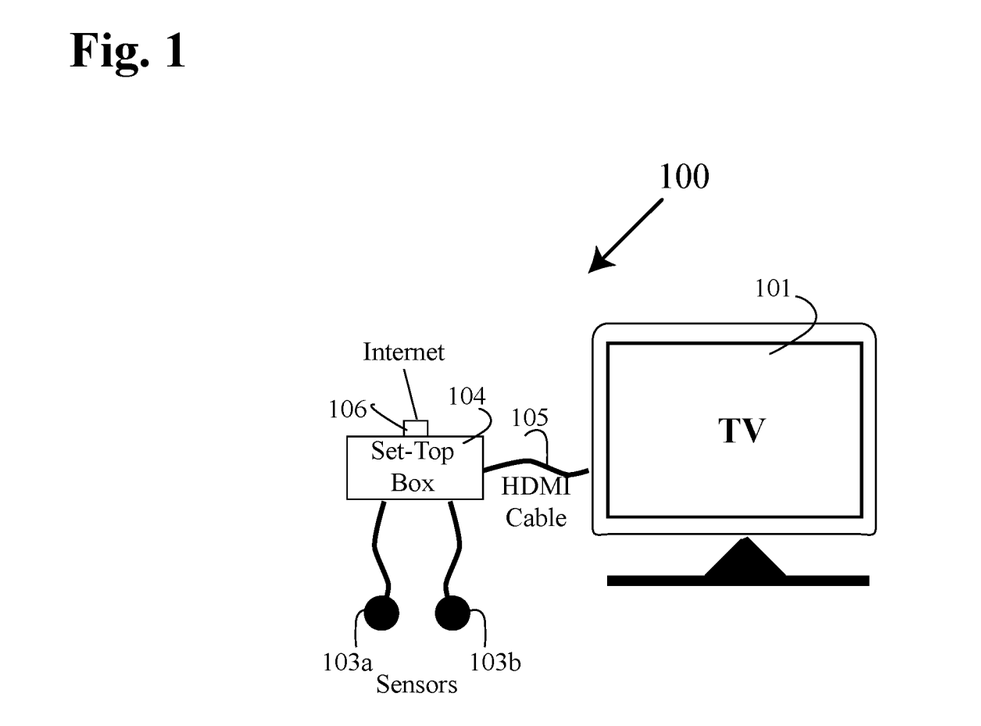
FIG. 1 is a schematic diagram illustrating how the TV is connected to a set-top box and ambient environment brightness and TV display brightness.

FIG. 1 is a schematic diagram illustrating how a display device, herein a TV with CEC functionality, is connected to an apparatus of the subject invention, herein a set-top box (STB), and ambient environment brightness and TV display brightness, shown generally at 100. A TV 101 is connected to set-top box 104 and connects to ambient environment brightness sensor 103a and TV display brightness sensor 103b. The set-top box has circuitry (see FIG. 7) including a microcontroller to process brightness information provided by one or more sensors 103a viewing ambient environment brightness and television display screen brightness. The connection between the set-top box and TV is a HDMI cable 105. The set-top box (STB) may be connected to a content service provider network (e.g. a hybrid fiber coaxial video service) and may have Internet connectivity as shown at 106. Alternatively, the STB preferably has network connectivity through a configured access point (AP), which in turn includes Internet connectivity and Internet protocol (see FIG. 7, for example).

Figure 2:
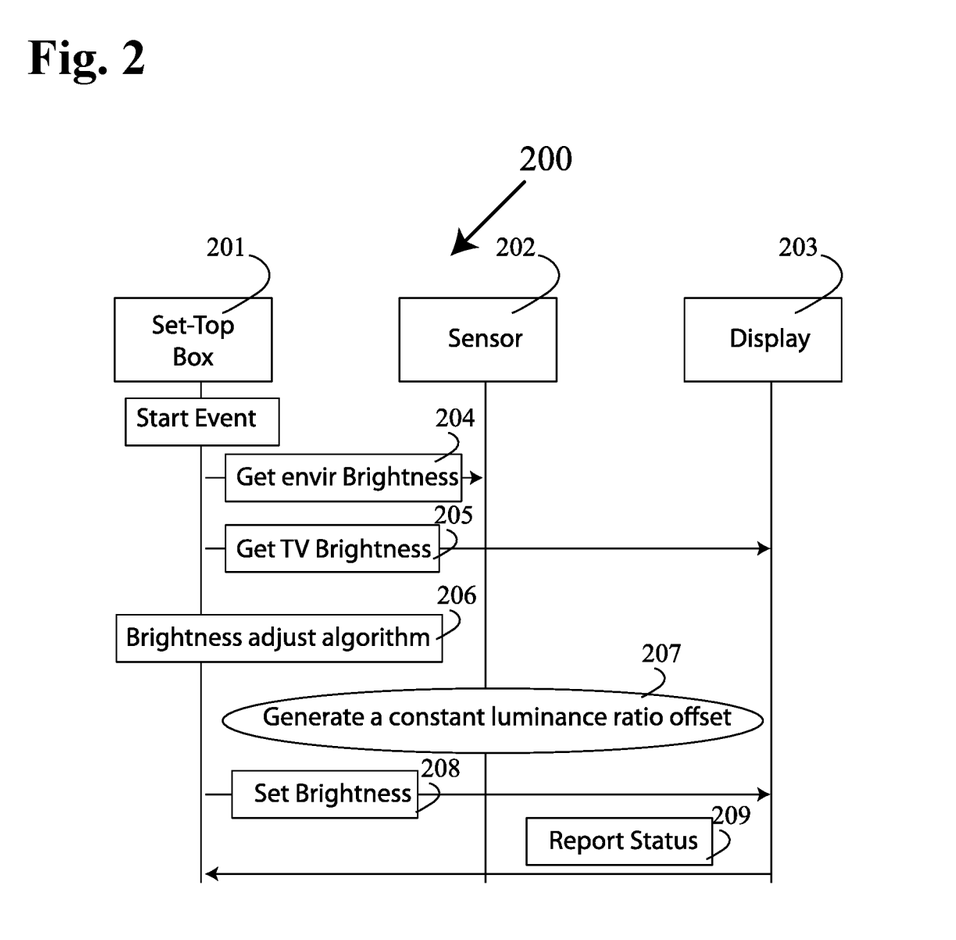
FIG. 2 illustrates the sequence of details of the automatic brightness control of a TV display by the set-top box.

FIG. 2 illustrates the sequence of details of the automatic brightness control of a TV display by the set-top box, shown generally at 200. The set-top box is shown at 201. The sensor is shown at 202. The TV display is shown at 203. The environmental brightness is detected by sensor 202 at step 204. The TV brightness is measured by sensor 202 at step 205. The brightness adjusting algorithm at step 206 in the set-top box calculates the needed TV brightness according to the environmental brightness measured. The display device brightness is given by the equation:

$$L = L_{min} + k*\arctan(L_{env})$$

L is the brightness of display device output;

$L_{min}$ is the minimal brightness of display device output, which could be set by an end user;

$L_{env}$ is the brightness from environment;

k is a constant luminance ratio offset.

The set-top box generates constant luminance ratio offset at step 207 that communicates with the CEC to adjust the contrast levels according to the TV brightness based on L (or $L_{TV}$ wherein the display device is a TV). The "luminance contrast" offset is the ratio between the higher luminance, $L_H$ (herein $L_{max}$), and the lower luminance, $L_L$ ($L_{min}$), that define the brightness to be detected. Preferably, the module generates k, performs the equation and communicates with the display device to adjust contrast levels according to L. The display brightness asymptotically reaches an $L_{max}$ as the $L_{env}$ becomes progressively brighter. $L_{max}$ may be set by the end user. At step 208, the brightness of the TV display is set for optimal viewing at environmental brightness conditions. The status of the adjustment is reported at step 209 to the main frame through Internet connection.

FIG. 3 illustrates more details of the HDMI device which is CEC enabled, shown generally at 300. A microcontroller driver is shown at 301 that comprises a product feature code, CEC feature code, CEC communication code triggered by CEC feature calls and CEC communication calls. It also comprises CEC UART logic or code and a CEC physical layer. The HDMI with CEC enabled product includes a set-top box 302 or a DVD player 303. At the bottom in the figure is a physical layer (PHY), which simultaneously drives and monitors the CEC bus. The PHY has a 1-bit control input and 1-bit monitor output. The control input tells the PHY when to pull the bus low, while the monitor output indicates the current logical state of the CEC bus. Above the PHY is a bit-level protocol layer, which is similar to a serial UART. The UART layer serializes and de-serializes bit streams, while buffering transmit and receive byte strings. For CEC enabled products including display device and the set-top box, the above architecture must be implemented on both sides. The foundation architecture is already supported in extant products. From set-top box perspective, CEC control signals are detected by HDMI controller (inside SOC on set-top box printed circuit board), HDMI service (a software process) to parse the CEC operation codes and do corresponding controls. Two proposals are presented for brightness control using software development:

Solution1: extend the current CEC Operation Code (http://www.microprocessor.org/HDMISpecification13a.pdf, should be same in HDMI 2.0b): Take reference to chapter "CEC Table 22 Message Descriptions for the System Audio Control Feature", create a new table for "System Brightness Control Feature", define new operation codes to control the display brightness level. Except for the operation code, the table should be quite similar to that used for "System Audio Control".

Solution2: implement in set-top box video output service (software process) to adjust the YUV configuration. This is an alternative solution to avoid changing the CEC protocol. In this solution the Y (brightness signal) value in SOC's video output configuration may be adjusted by software.

The subject system, method and computer readable medium contemplates at least two kinds of features present in the set-top box instead of the display device, including: (i) Smart control or software, which needs to be upgraded frequently; and (ii) Peripheral equipment such as a web camera, microphone (to support voice control and video conference), gaming input devices, etc. The benefit of putting these features into a source device, such as a set-top box, includes the increased convenience realized when keeping such features up-to-date. In addition, and it would be more flexible for the end user to move a set-top box containing such features to another display device in another room. A traditional tuner or Ethernet interface can also be removed from the TV and provided in the set-top box.

In addition, the subject apparatus, method and computer readable memory instructions may include functionality to not only automatically adjust the brightness of the display device, but to also automatically adjust the audio volume of the display device. Based on the luminance or brightness of light detected by the sensor of the subject apparatus, the set-top box can also automatically select a lower volume level. For example, when the ambient light is low such as when "night" comes (which means a lower luminance level detected) not only can the subject apparatus (or STB) cause the brightness of the TV to be adjusted, but the audio volume can automatically be lowered through the control module. Conversely, the audio volume can be automatically adjusted higher volume when the room becomes brighter. This is an adjustment that can be turned off at the option of the user.

A similar approach can be employed for subtitles (closed caption). By dividing different luminance amounts to "day" and "night" mode, one can assume that in "night" mode, a lower volume is expected (based on the assumption that in night the environment noise will be lower than in day). To enhance hearing, a subtitle (close caption) will be automatically shown on screen to assist with text reading. This feature is also an option for the end user.

Both pure Internet protocol TV (IPTV) set-top box and hybrid set-top box (Internet protocol+Cable) can benefit from luminance data centrally gathered and analyzed online.

Figure 4:
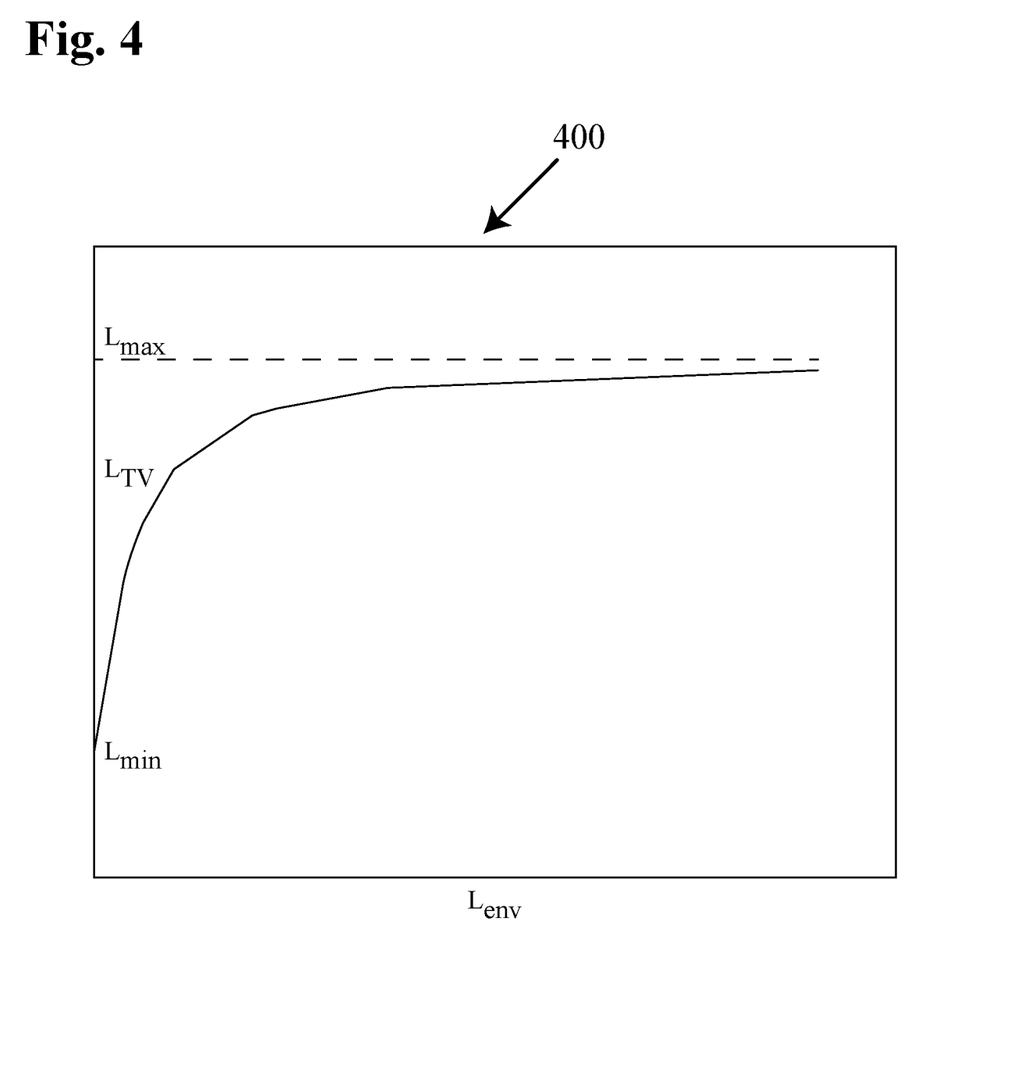
FIG. 4 is a schematic graph representing the relationship between TV display brightness as a function of ambient environmental brightness.

FIG. 4 is a schematic graph representing the relationship between TV display brightness as a function of ambient environmental brightness, shown generally at 400. While there are many theoretical equations that detail this graphical representation, the main feature is that at low ambient brightness levels, the brightness of the TV must be reduced to prevent TV display age-bleaching. Also, the contrast levels must be reduced accordingly. When the ambient environmental brightness is high, the TV display brightness intensity needs to be increased for better viewing of the TV images, but there is a limit to the TV brightness at a maximum value, which is indicated at $L_{max}$.

The equation used to generate this graph is:

$$L_{TV} = L_{min} + k * \arctan(L_{env})$$

Figure 5:
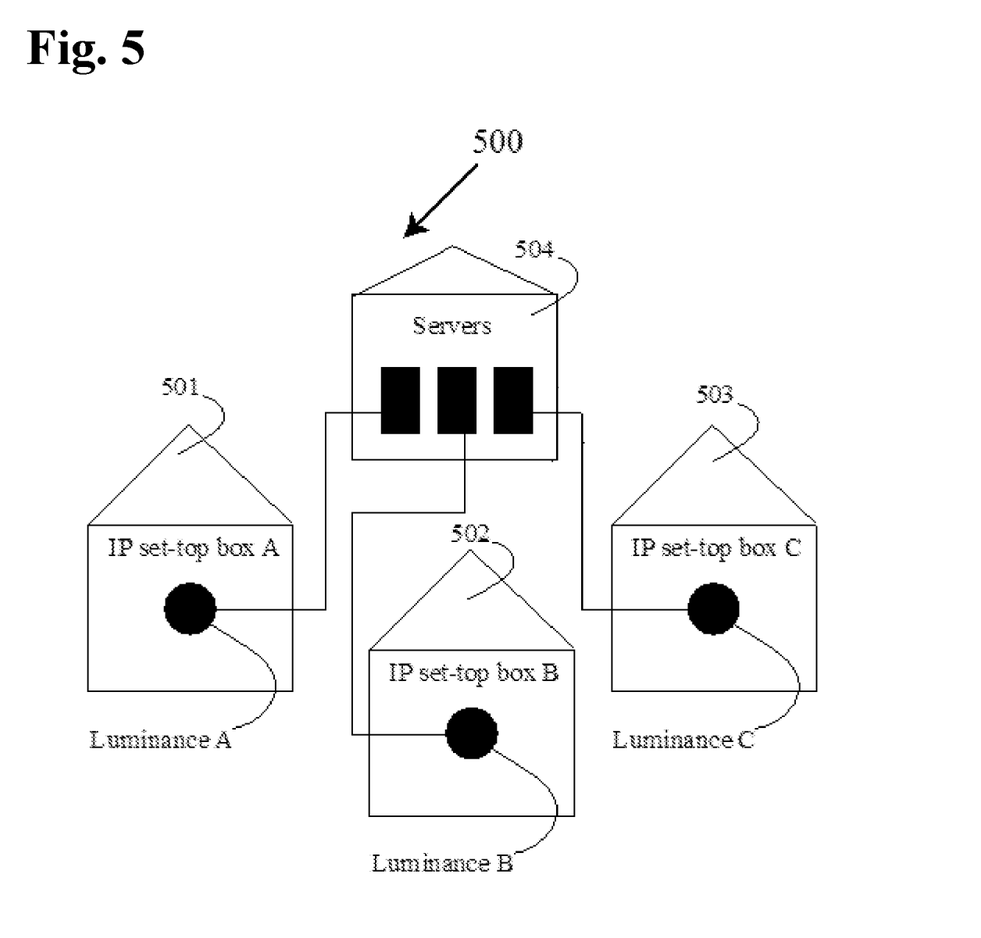
FIG. 5 illustrates a system for gathering luminance data and analysis on-line.

$L_{TV}$ is the brightness of TV output
$L_{min}$ is the minimal brightness of TV output, which could be set by end user.
$L_{env}$ is the brightness from environment
k is a constant FIG. 5 illustrates a system for gathering luminance data and analysis on-line, shown generally at 500. Luminance data from three devices Internet protocol set-top box A at 501, Internet protocol set-top box B at 502, and Internet protocol set-top box C at 503 are collected and sent to server 504 using network cable for on-line analysis. The clients set-top boxes may be bi-directional boxes with an upload channel (either Ethernet cable/fiber or through DOCSIS cable modem) and download channel.

The purpose for gathering the user luminance data is to realize the following information: (i) Gather the big data of the user behavior/habit, to determine the most common TV watching environment; (ii) Analyze the data combined with the program name and volume level.

Figure 6:
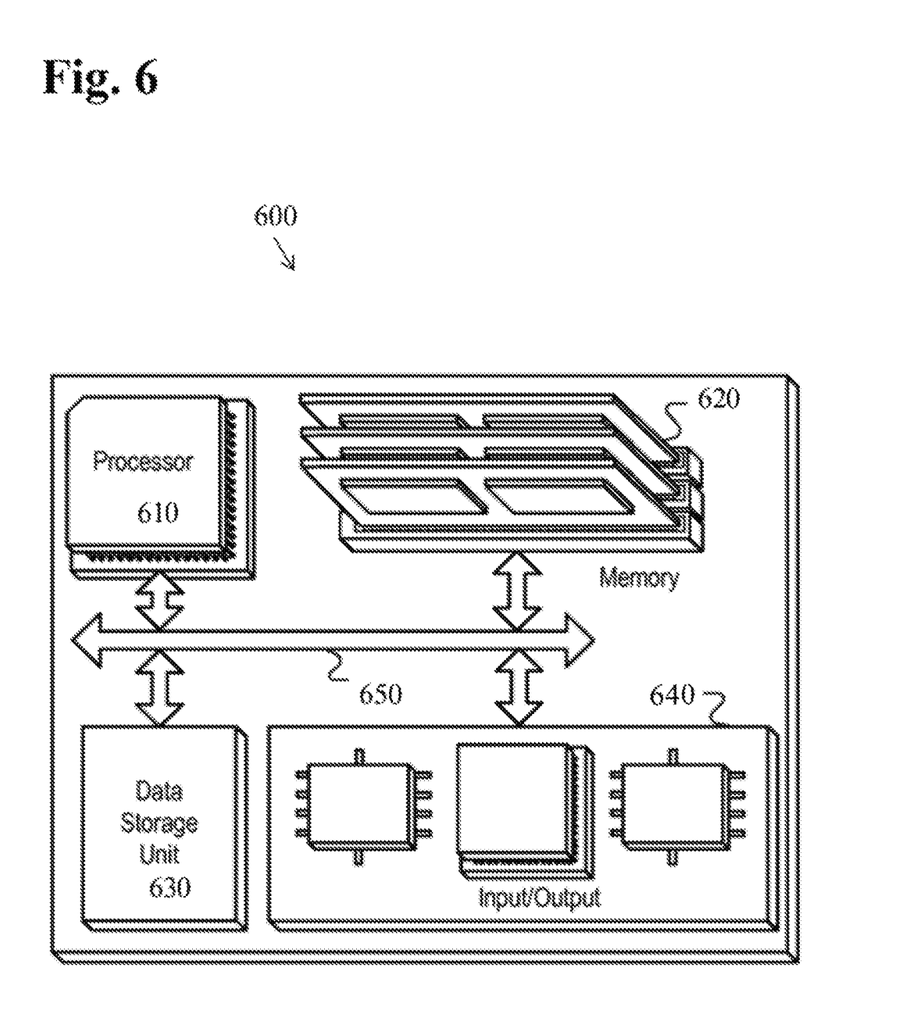
FIG. 6 is a block diagram of a hardware configuration operable to facilitate the subject auto brightness controlled adjustment by the set-top box.

FIG. 6 is a block diagram of a hardware configuration operable to facilitate the subject auto brightness controlled adjustment by the set-top box, shown generally at 600. The hardware configuration can include a processor 610, a memory 620, a storage device 630, and an input/output device 640. Each of the components 610, 620, 630, and 640 can, for example, be interconnected using a system bus 650. The processor 610 can be capable of processing instructions for execution of the subject method, system and computer readable media within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630. The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit. In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600. The input/output device 640 provides input/output operations for the hardware configuration 600. In one implementation, the input/output device 640 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a CPE device (e.g., access point, cable modem, router, wireless extender, or other access device) or subscriber device (e.g., set-top box/station, etc.). In another implementation, the input/output device can include driver devices configured to send communications to, and receive communications from one or more networks (e.g., WAN, local network, cloud, headend/cloud controller, etc.).

Those skilled in the art will appreciate that the invention improves upon methods and systems for adjusting viewing brightness and luminance of a television screen through set-top box control. The subject matter of this disclosure, and components thereof, can be realized by software instructions that upon execution cause one or more processing devices to carry out the processes and functions described above. Such instructions can, for example, comprise interpreted instructions, such as script instructions, e.g., JavaScript or ECMAScript instructions, or executable code, SoftAp mode pulse timing activation and deactivation instructions, signal strength activation and deactivation software, initial fingerprint (birth certificate) logarithmic and execution instructions, activation signals or software, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

Figure 7:
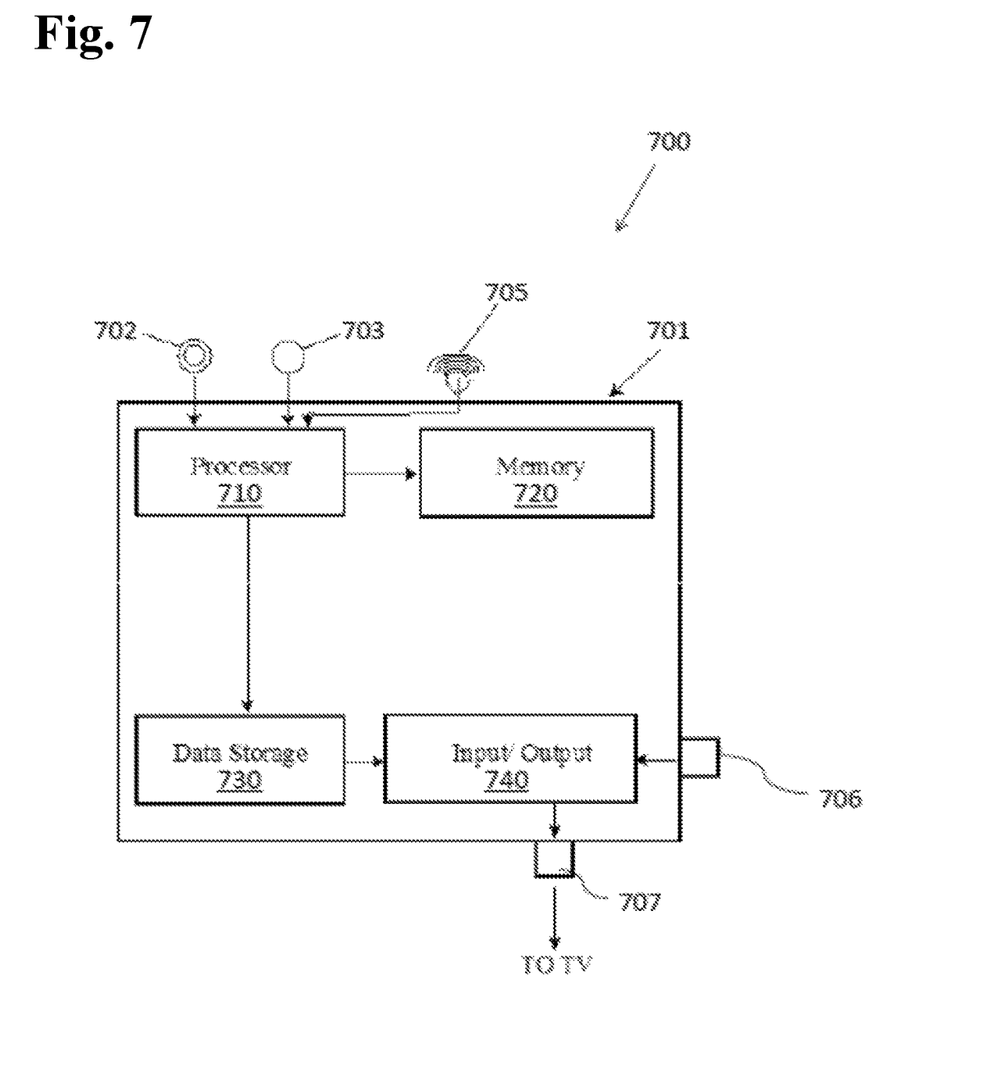
FIG. 7 is an architecture diagram of elements of an STB which performs the subject invention.

FIG. 7 is an architecture diagram of elements of a set-top box (STB) which performs the invention, shown generally at 700. A STB 701 is shown as a source device or apparatus for implementation of the subject invention. The STB 701 includes hardware generally configured having a module including a processor 710, a memory 720, a storage device 730, and an input/output device 740. Each of the components 710, 720, 730, and 740 can, for example, be interconnected using a system bus. The processor 710 can be capable of processing instructions for execution of the subject method, system and computer readable media within the hardware configuration 700 (see for example, as discussed in relation to FIG. 6). STB 701 includes WiFi/Bluetooth Internet connection 705. Preferably STB 701 includes one or more ambient light and/or light and sound sensor 702. Sensor 702 may be integrated into STB 701 or it may be connected by way of an extension wire through a USB port or via connected by way of wireless connection through the WiFi/Bluetooth Internet 705 connection. When the ambient light intensity is low, the brightness and optionally sound output volume from TV is also decreased using the CEC code sent through the HDMI connection to the TV. The TV display brightness and contrast is measured by sensor 703. Like sensor 702, the TV brightness/contrast sensor 703 may be integrated within the STB 701 or it may be connected by way of an extension wire through a USB port or by way of wireless connection through the WiFi/Bluetooth Internet 705 connection. STB 701 is in communication with a provider service 706. The STB 701 may be connected through an access point (AP) or networking hardware device allowing the STB 701 and other Wi-Fi compliant devices to connect to a wired network of the service provider 706. STB 701 is connected through a high-definition multimedia interface (HDMI) 707 to a display device, herein a consumer electronics control (CEC) enabled television. A smart phone, tablet or a computer can access the set box using a wireless access point password or an application, and program the features of the set-top box. The display intensity as well as the volume of the TV or smart phone, tablet or a computer may be manually increased or decreased.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order unless otherwise noted, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. An apparatus for adjusting brightness of a display device, comprising:
    a first interface configured to provide information, including display brightness information, to the display device through a high-definition multimedia interface (HDMI);
    brightness circuitry configured to process brightness information from one or more sensors detecting environmental brightness;
    a processor configured to generate control information to set the brightness of the display device based on the environmental brightness and to provide the control information to the display device;
    wherein the brightness of the display device set by the processor is given by the equation:

$$L=L\min+k*\arctan(L\text{env})$$

L is the brightness of display device;
    Lmin is the minimal brightness of display device;
    Lenv is environmental brightness detected by the sensors; and
    k is a constant luminance ratio offset.

2. The apparatus for adjusting brightness of a display device as recited by claim 1, wherein the processor generates k, performs the equation and communicates with the display device to adjust contrast levels according to L.

3. The apparatus for adjusting brightness of a display device as recited by claim 1, wherein the brightness of the display device asymptotically reaches an Lmax as the Lenv becomes progressively brighter.

4. The apparatus for adjusting brightness of a display device as recited by claim 1, wherein the display device is a television (TV).

5. The apparatus for adjusting brightness of a display device as recited by claim 1, wherein the apparatus is a set-top box (STB) having Internet connectivity accessing a server.

6. The apparatus for adjusting brightness of a display device as recited by claim 5, wherein the processor is configured to access Internet video and audio file for display on the display device.

7. The apparatus for adjusting brightness of a display device as recited by claim 6, wherein display brightness information of the television is collected by a server and analyzed on-line.

8. The apparatus for adjusting brightness of a display device as recited by claim 5, wherein the processor is configured to access hand held devices for manual control of brightness and luminance using Internet connectivity.

9. The apparatus for adjusting brightness of a display device as recited by claim 1, wherein the display device is a consumer electronics control (CEC) enabled television.

10. The apparatus for adjusting brightness of a display device as recited by claim 1, wherein the light sensor is integrated within a set-top box.

11. The apparatus for adjusting brightness of a display device as recited by claim 1, wherein the light sensor includes an extension adapted to connect to the light sensor and the apparatus.

12. The apparatus for adjusting brightness of a display device as recited by claim 1, wherein Lmin is set by a user.

13. A method for providing instructions to adjust brightness of a display device connected to a source device, comprising the steps of:
    detecting an environmental brightness proximate to the display device;
    determining a preferred viewing brightness of the display device based on the environmental brightness;
    determining control information to instruct the display device to provide the preferred viewing brightness; and
    providing the control information to the display device, wherein the control information is provided from the source device to the display device through a high-definition multimedia interface (HDMI);
    wherein the preferred viewing brightness of the display device is given by the equation:

$$L=L\min+k*\arctan(L\text{env})$$

L is the preferred viewing brightness of display device;
    Lmin is the minimal brightness of display device;
    Lenv is environmental brightness detected by the sensors; and
    k is a constant luminance ratio offset.

14. The method for providing instructions to adjust brightness of a display device connected to a source device as recited by claim 13, further comprising:
    generating the constant luminance ratio offset k; and
    adjusting contrast levels according to L.

15. The method for providing instructions to adjust brightness of a display device connected to a source device as recited by claim 13, wherein the preferred viewing brightness of display device asymptotically reaches an Lmax as the Lenv becomes progressively brighter.

16. The method for providing instructions to adjust brightness of a display device connected to a source device as recited by claim 13, wherein the source device is a set-top box having Internet connectivity accessing a server.

17. The method for providing instructions to adjust brightness of a display device connected to a source device as recited by claim 13, wherein the display device is a consumer electronics control (CEC) enabled television.

18. The method for providing instructions to adjust brightness of a display device connected to a source device as recited by claim 13, wherein Lmin is set by a user.

19. One or more non-transitory computer readable media having instructions operable to cause one or more processors to adjust brightness of a display device connected to a source device and to perform operations comprising:

detecting an environmental brightness proximate to the display device;

determining a preferred viewing brightness of the display device based on the environmental brightness;

determining control information to instruct the display device to provide the preferred viewing brightness; and providing the control information to the display device; wherein the control information is provided from the source device to the display device through a high-definition multimedia interface (HDMI);

wherein the preferred viewing brightness of the display device is given by the equation:

$$L = Lmin + k * \arctan(Lenv)$$

L is the preferred viewing brightness of display device;
Lmin is the minimal brightness of display device;
Lenv is environmental brightness detected by the sensors; and
k is a constant luminance ratio offset.

20. The one or more non-transitory computer readable media as recited by claim 19, wherein Lmin is set by a user.

* * * * *